Figure 1:
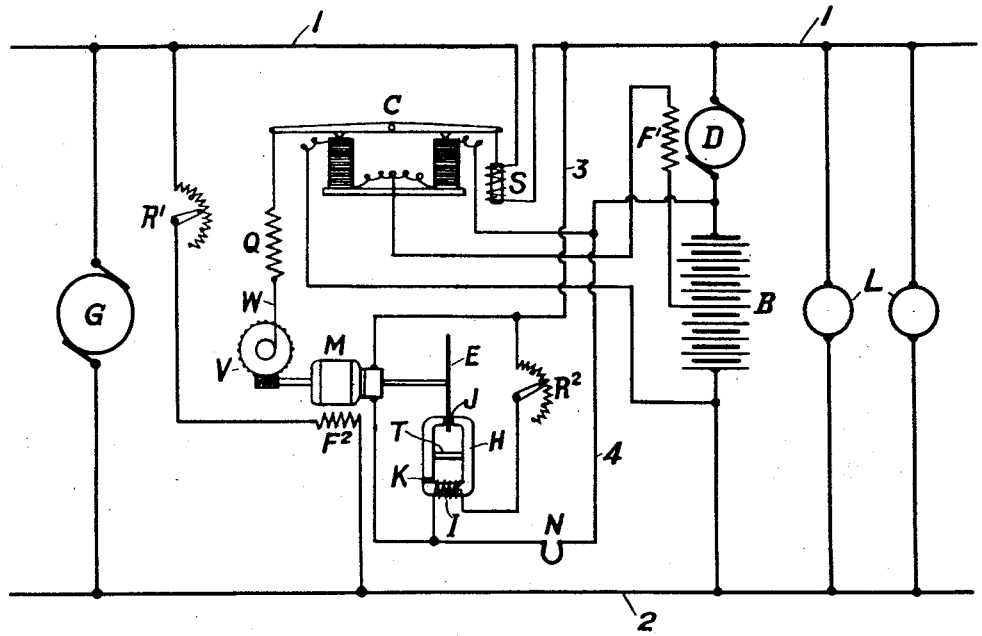

J. L. WOODBRIDGE.
SYSTEM OF ELECTRICAL DISTRIBUTION.
APPLICATION FILED NOV. 10, 1909.

1,058,832.

Patented Apr. 15, 1913.

WITNESSES:

INVENTOR
Joseph L. Woodbridge
BY
Augustus B. Stoughton
ATTORNEY.

UNITED STATES PATENT OFFICE.

JOSEPH L. WOODBRIDGE, OF PHILADELPHIA, PENNSYLVANIA.

SYSTEM OF ELECTRICAL DISTRIBUTION.

1,058,832.   Specification of Letters Patent.   Patented Apr. 15, 1913.

Application filed November 10, 1909. Serial No. 527,225.

*To all whom it may concern:*

Be it known that I, JOSEPH LESTER WOODBRIDGE, a citizen of the United States, and a resident of Philadelphia, in the county of Philadelphia and State of Pennsylvania, have invented a certain new and useful System of Electrical Distribution, of which the following is a specification.

This invention comprises means for controlling the speed of an electric motor. It is particularly applicable to the control of an electric motor arranged to control the operation of storage battery regulating apparatus such as is shown and described in Patent #895,760 issued to Robert C. Hull on August 11th, 1908, and in Patent #895,825 issued to me on August 11th, 1908.

The systems of electrical distribution disclosed in the patents above cited include storage battery regulating apparatus responsive to departures from any predetermined average load on the generators and include a motor arranged to control said regulating apparatus so as to slowly vary the load on the generators, this motor being responsive to departures from some predetermined condition of the battery circuit. In such a system of electrical distribution it is frequently found desirable that the motor should attain its maximum speed upon a slight departure from the predetermined condition of the battery circuit and should maintain this speed practically constant for all greater departures from such predetermined condition. For example, if a sudden increase of load occurs on the consumption circuit and the regulating apparatus is arranged to transfer this load immediately to the battery and then slowly from the battery to the generators, it may be desirable to effect this transfer from the battery to the generators as rapidly as permissible without disturbing the operation of the latter, whether the load fluctuation be small or great. In the present invention I provide means for controlling the motor which produces this transfer in such a way as to bring about this result.

Broadly, the invention includes means for applying to the motor an artificial load which is practically zero at the start and remains negligible below a certain speed, while beyond that point it increases rapidly for small increase of speed. I also provide, in circuit with the motor armature or field winding (whichever is made responsive to the electrical condition of the battery circuit) controlling means for limiting the flow of current in said armature or field circuit, thus limiting the motor torque notwithstanding a considerable rise of the voltage applied to the circuit which includes this armature or field winding. It will be understood that while I have shown and described below the application of this invention to battery controlling apparatus, the invention itself is not in any way limited to this class of apparatus, and it will be obvious that the invention may be applied to the control of motor speed for many other purposes.

My invention will be more clearly understood by reference to the accompanying diagrams, in which—

Figure 2:
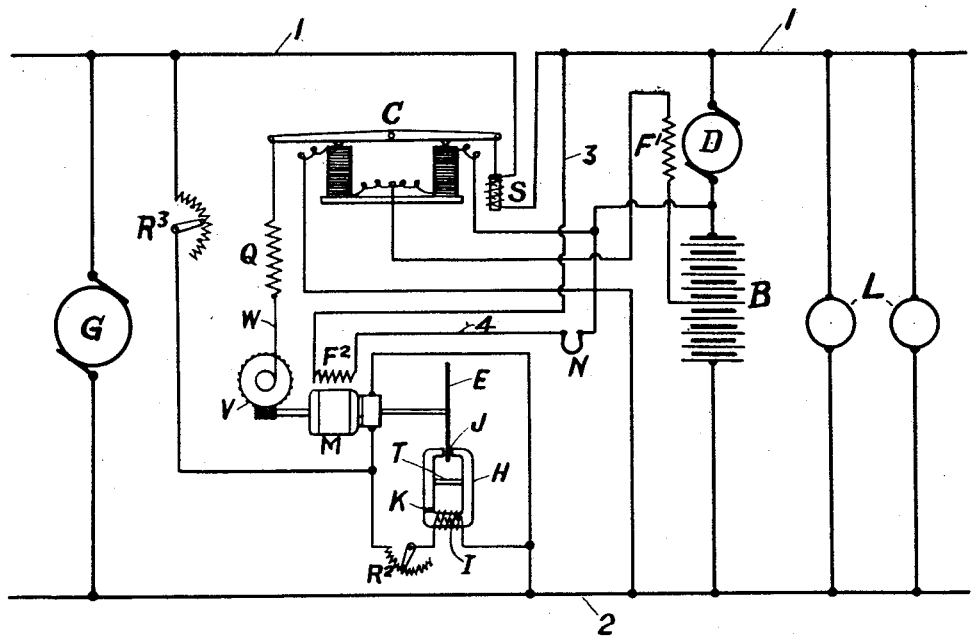

Figure 1 shows one embodiment of the invention in which the motor armature is made responsive to the electrical condition of the battery circuit, while Fig. 2, shows a modification in which the motor field is made so responsive.

Referring to Fig. 1, G is a generator supplying current to the circuit 1—2 to which are connected translating devices L constituting a fluctuating load. Across the circuit 1—2 is connected the storage battery B with its booster D, the field $F^1$ of the latter being controlled in the usual manner by the carbon regulator C, responsive by means of the solenoid S, connected into the conductor 1, to small fluctuations of load on the generator G. The average current on the generator, passing through the solenoid S, is balanced by the tension of the spring Q at the other end of the lever of the carbon regulator. Variations in the tension of this spring will therefore change the load on the generator in the well known manner. The tension of the spring Q is controlled by the motor M and the worm gear V, which, according to the direction of rotation of the motor, will wind up or unwind the flexible cord W attached to the lower end of the spring. The motor M is provided with a field winding $F^2$ which in this case is connected directly across the circuit 1—2 in series with the rheostat $R^1$. For any setting of this rheostat a constant excitation is supplied to the field of the motor. The armature of the motor is connected by means of conductors 3 and 4 across the terminals of the booster D. The adjustment is such that when the voltage of the booster D is zero the battery is neither charging nor discharging and the motor M will be at rest, since the voltage applied to its armature is zero. Any variation of booster voltage from the zero point will cause the battery to charge or discharge and at the same time will send current through the armature of the motor M, which will rotate it in the direction to change the tension on the spring Q and bring the voltage of the booster gradually back to zero, thus transferring the fluctuation of load from the battery to the generator. As described in the patents cited above this effect is produced slowly so that the battery takes the quick fluctuations of load and the generator load follows the slow changes in the average demand.

Mechanically connected to the motor M is shown a damping device consisting of a conducting disk E mounted on the shaft of the motor and rotated between the poles of an electro-magnet H. This electro-magnet is excited by a coil I connected across the conductors 3—4, and therefore in parallel with the armature of the motor M. This magnet is provided with a magnetic shunt T, of comparatively small cross-section, connected across the magnetic circuit in parallel with the air gap J in which the disk E revolves. The magnetic circuit is also interrupted by a gap of non-magnetic material K so located that all the magnetic lines produced by the exciting coil I must pass across this gap and then sub-divided between the magnetic shunt T and the air gap J. In series with the coil I is a rheostat $R^2$ which serves to adjust the action of the coil I and determine the speed of the motor M. In series with conductor 4 is a resistance N of high temperature co-efficient, such for example, as the well known hot wire resistances which have the property of increasing rapidly in resistance at a certain critical point with very small changes of current thereby maintaining a substantially constant current in the circuit with wide variations of applied voltage, after said voltage exceeds a certain point.

The operation of this apparatus will then be as follows: With zero voltage across the booster D the armature of the motor M will receive no current and will remain at rest. A small voltage in the booster D will send current through the armature of the motor M by way of conductors 3 and 4 and will start the motor. The resistance of the coil I is large as compared with that of the armature winding of the motor and the coil I will therefore divert but little current from the armature at low booster voltages. This small current in the coil I will produce some mechanism in the magnet H but practically all of the magnetic lines will pass through the shunt T and there will be no lines in the air gap J. The disk E will therefore have no effect upon the motor. The torque required to start the motor will be somewhat greater than that required to keep it in motion after it is once started, its load being principally friction. Once started the motor will therefore continue to increase in speed until its counter electro-motive-force has risen sufficiently to reduce the current in its armature to the point of equilibrium and it will continue to run at this speed so long as the voltage of the booster D is constant. As the voltage of the booster increases there will be a tendency to increase the speed of the motor correspondingly. The increase of voltage applied to the coil I will however soon saturate the magnetic shunt T and force magnetic lines across the air gap J. This will produce a retarding action on the disk E, calling for increased current in the motor armature in order to carry its load. This increase of current will produce an increasing drop in the resistance N which will reduce the voltage applied to the armature terminals of the motor and prevent its speed from rising. The characteristic of the resistance N may be so chosen that at a comparatively low voltage across this resistance it will reach its critical point beyond which the current which it will transmit remains practically constant for a comparatively wide variation of voltage. So long as this current is held constant the speed of the motor must remain constant since any increase in speed would increase the retarding effect of the disk E and call for additional current in the motor armature to produce the additional torque required.

In Fig. 2, is shown a modification of the apparatus included in Fig. 1. In this figure the armature of the motor M is connected across the conductors 1—2 in series with the rheostat $R^3$. The apparatus may be so designed that the counter electro-motive-force of the motor M is always small as compared with the voltage across the circuit 1—2, so that the current passing through the rheostat $R^3$ will be substantially constant and independent of the counter electro-motive-force of the motor. The field $F^2$ of the motor is connected across the booster terminals by means of the conductors 3—4 in series with the resistance N. As described in connection with Fig. 1, the coil I with its controlling rheostat $R^2$ is connected in parallel with the motor armature, so that an increase in the counter electro-motive-force of the motor, whether due to an increase in its speed or its field strength, will divert a part of the total current passing through $R^3$ from the armature through the coil I and increase the retarding action of the disk E. The results obtained from this arrangement of apparatus will be similar to those obtained from the arrangement shown in Fig. 1. When the booster voltage is zero the motor M will be at rest as it will have no field excitation. As soon as a small voltage is developed in the booster D, current will flow through the field coil F² and the motor will start. The torque required to keep the motor in motion after it once starts will be somewhat less than the starting torque and the motor will therefore speed up until a certain limit is reached when the current diverted from the motor armature through the coil I will produce a sufficient reduction in the motor torque and a sufficient retarding effect in the disk E to prevent further increase of speed. If the voltage of the booster increases beyond this point the increase in the field strength of the motor will increase the torque of the motor and at the same time increase the counter electro-motive-force even with no increase of speed. This increase of counter electro-motive-force will divert more of the total current passing through R³ from the armature through the coil I thus reducing the motor torque to some extent, and at the same time further increasing the retarding action of the disk E. By properly designing the apparatus this latter effect may be made to balance the effect due to the increase in the field strength and the speed may be held constant regardless of the increase of voltage of the booster. The effect of the resistance N, which has a high temperature coefficient as described in connection with Fig. 1, will limit the increase of current in field winding F² after the voltage of the booster has reached a certain point and therefore assist in maintaining constant motor speed regardless of variations in the booster voltage.

It will be understood that modifications may be made in the details of the apparatus without departing from the spirit of the invention.

What I claim therefore, and desire to secure by Letters Patent is—

1. In combination a source of constant potential, a source of varying potential, an electric motor provided with a field winding and an armature winding, means for transmitting current to one of said windings from the constant potential source, a conducting circuit from the other of said windings to the source of varying potential, a magnetic braking device for the motor, an exciting coil for said device connected in parallel with the motor armature, and a resistance for limiting the total current supplied to the armature and exciting coil.

2. In combination a source of constant potential, a source of varying potential, an electric motor provided with a field winding and an armature winding, means including a resistance for transmitting current to the armature winding from the constant potential source, a conducting circuit from the field winding to the source of varying potential, a device in the last named circuit adapted to limit the current variations therein, a magnetic braking device for the motor, and an exciting coil for the braking device connected in parallel with the motor armature, exclusive of the resistance.

3. In combination a consumption circuit and its source, a storage battery operatively arranged to deliver and receive energy to and from the circuit, regulating apparatus for controlling the charge and discharge of the battery in response to departures from a predetermined electrical condition of the circuit, a motor for controlling said apparatus with respect to the predetermined condition to departures from which it is responsive, said motor provided with an armature winding and a field winding, means for connecting one of said windings into a substantially constant current circuit, a connecting circuit for supplying current to the other winding responsive to the electrical condition of the battery circuit, and a device for limiting the current in said connecting circuit whereby the speed of the motor is limited.

4. In combination a consumption circuit and its source, a storage battery operatively arranged to deliver and receive energy to and from the circuit, regulating apparatus for controlling the charge and discharge of the battery in response to departures from a predetermined electrical condition of the circuit, a motor for controlling said apparatus with respect to the predetermined condition to departures from which it is responsive, said motor provided with an armature winding and a field winding, means for connecting one of said windings into a substantially constant current circuit, a connecting circuit for supplying current to the other winding responsive to the electrical condition of the battery circuit, a device for limiting the current in said connecting circuit, and means for applying to the motor a load independent of the regulating apparatus and adapted to increase with increase of motor speed whereby said speed is limited.

5. In combination two sources of electrical energy connected in parallel relation, apparatus for controlling the division of load between them including a motor having field and armature windings, an electro-magnetic brake for the motor, a circuit including the field winding of said motor, another circuit including in parallel relation the armature winding and the exciting coil of the electro-magnetic brake, means for transmitting a substantially constant current to one of said circuits and means for connecting the other to respond to variations of electrical condition of one of the sources.

6. In combination two sources of electrical energy connected in parallel relation, apparatus for controlling the division of load between them including a motor having field and armature windings, an electro-magnetic brake for the motor, a circuit including the field winding of said motor, another circuit including in parallel relation the armature winding and the exciting coil for the electro-magnetic brake, means for transmitting a substantially constant current to one of said circuits and means for connecting the other to respond to variations of electrical condition of one of the sources and a device in the last named circuit for limiting the current therein.

7. In combination a storage battery, means for controlling its charge and discharge, an electric motor for automatically adjusting said controlling means, an electro-magnetic brake for said motor including a magnetic circuit consisting of a main magnetic path completed by two magnetic paths in parallel relation whereof one has a smaller cross section than the main path, while the other is interrupted by a non-magnetic gap, a conducting body revoluble by the motor in said gap, a second non-magnetic gap in the main path and an exciting coil for said main path.

8. In combination a storage battery, means for controlling its charge and discharge, an electric motor for automatically adjusting said controlling means, an electro-magnetic brake for said motor including a magnetic circuit consisting of a main magnetic path completed by two magnetic paths in parallel relation whereof one has a smaller cross section than the main path, while the other is interrupted by a non-magnetic gap, a conducting body revoluble by the motor in said gap, a second non-magnetic gap in the main path and an exciting coil for said main path connected in parallel with the motor armature.

9. In combination a constant potential consumption circuit, two sources of electrical energy connected thereto, apparatus for controlling the division of load between them including a motor having field and armature windings, an electro-magnetic brake for the motor, a circuit including the field winding of said motor, another circuit including in parallel relation the armature winding and the exciting coil for the electro-magnetic brake, means for transmitting current from the consumption circuit to one of said circuits, and means for connecting the other to respond to variations of electrical condition of one of the sources.

10. In a system of electrical distribution including a storage battery, apparatus for controlling its charge and discharge, an electric motor for regulating said apparatus, said motor provided with a field winding and an armature winding, and circuit connections from one of said windings adapted to transmit thereto current responsive to changes of electrical condition in the battery circuit, the combination of a resistance of high temperature co-efficient included in said circuit connections with a braking device for the motor adapted to apply a resistance increasing with increase of motor speed, whereby said increase of speed is checked abruptly at a predetermined point.

11. In combination with field controlling apparatus an electric motor for varying the adjustment of said apparatus having a field winding and an armature winding, independent circuit connections for the two windings, a resistance in series with the armature winding and a branch circuit in parallel relation with the armature winding exclusive of said resistance for increasingly diverting current therefrom upon increase of armature counter-electro-motive-force.

12. In combination with field controlling apparatus, an electric motor for varying the adjustment of said apparatus having a field winding and an armature winding, independent circuit connections for the two windings, a resistance in series with the armature winding, a branch circuit in parallel with the armature winding exclusive of said resistance for increasingly diverting current therefrom upon increase of armature counter-electro-motive-force, and means for applying an artificial load to the motor.

13. In combination two sources of electrical energy connected in parallel relation, field regulating apparatus for controlling the division of load between them, an electric motor for varying the adjustment of said apparatus having a field winding and an armature winding, means for connecting one of said windings to respond to changes of electrical condition of one of said sources, circuit connections for transmitting current to the other of said windings, a resistance in series with the armature winding, and a branch circuit in parallel with the armature winding exclusive of said resistance for increasingly diverting current therefrom upon increase of armature counter electro-motive-force.

14. In combination two sources of electrical energy connected in parallel relation, field regulating apparatus for controlling the division of load between them, an electric motor for varying the adjustment of said apparatus having a field winding and an armature winding, means including a resistance of high temperature co-efficient for connecting one of said windings to respond to changes of electrical condition of one of said sources, separate circuit connections for transmitting current to the other of said windings and a braking device for the motor adapted to apply increasing resistance with increase of motor speed, whereby said increase of speed is checked abruptly at a predetermined point.

15. In combination two sources of electrical energy connected in parallel relation, field regulating apparatus for controlling the division of load between them, and electric motor for varying the adjustment of said apparatus having a field winding and an armature winding, means including a resistance of high temperature co-efficient for connecting one of said windings to respond to changes of electrical condition of one of the sources, separate circuit connections for transmitting current to the other of said windings, a branch circuit in parallel with the armature winding for increasingly diverting current from said winding upon increase of armature counter-electro-motive-force, and means for applying to the motor a load independent of the regulating apparatus.

16. In a system of electrical distribution including an electric circuit, regulating apparatus in operative relation thereto, a motor for controlling said regulating apparatus having a field winding and an armature winding, means for transmitting uni-directional current through one of said windings, and connections for transmitting through the other winding current varying in amount and direction in response to changes in the electrical condition of the circuit, the combination of a device connected in series with the latter winding and adapted to increase in resistance with increase of current strength and a braking device for the motor adapted to apply resistance increasing with increase of motor speed, whereby said increase of speed is checked abruptly at a predetermined point.

In testimony whereof I have hereunto signed my name.

JOSEPH L. WOODBRIDGE.

Witnesses:
 FRANK E. FRENCH,
 K. M. GILLIGAN.